United States Patent
Lee et al.

(10) Patent No.: US 11,939,000 B2
(45) Date of Patent: Mar. 26, 2024

(54) FRAME STRUCTURE FOR A PURPOSE BUILT VEHICLE

(71) Applicants: HYUNDAI MOTOR COMPANY, Seoul (KR); KIA CORPORATION, Seoul (KR)

(72) Inventors: Won Hae Lee, Seoul (KR); Nam Ho Kim, Gwangmyeong-si (KR); Byung Joo Chung, Gunpo-si (KR); Seung Hak Lee, Asan-si (KR); Min Seok Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/947,860

(22) Filed: Sep. 19, 2022

(65) Prior Publication Data
US 2023/0264742 A1  Aug. 24, 2023

(30) Foreign Application Priority Data
Feb. 21, 2022  (KR) .......................... 10-2022-0022199

(51) Int. Cl.
*B62D 21/11* (2006.01)
*B60G 7/02* (2006.01)
*B62D 21/03* (2006.01)

(52) U.S. Cl.
CPC ................ *B62D 21/11* (2013.01); *B60G 7/02* (2013.01); *B62D 21/03* (2013.01)

(58) Field of Classification Search
CPC ........... B62D 21/11; B62D 21/03; B60G 7/02
See application file for complete search history.

(56) References Cited

U.S. PATENT DOCUMENTS

| | | | | |
|---|---|---|---|---|
| 9,650,074 | B2 * | 5/2017 | Shirooka | B62D 25/082 |
| 2016/0236718 | A1 * | 8/2016 | Tatsuwaki | B60R 19/34 |
| 2017/0217501 | A1 | 8/2017 | Takeda | |
| 2021/0331749 | A1 | 10/2021 | Hwang et al. | |
| 2022/0388577 | A1 * | 12/2022 | Fekete | B62D 25/082 |
| 2023/0033710 | A1 * | 2/2023 | Panday | B60K 1/04 |

FOREIGN PATENT DOCUMENTS

| | | | |
|---|---|---|---|
| JP | 2001310755 A | | 11/2001 |
| JP | 2005081954 A | * | 3/2005 |
| JP | 2005081954 A | | 3/2005 |
| JP | 4951459 B2 | | 6/2012 |
| JP | 5017130 B2 | | 9/2012 |
| KR | 20210130883 A | | 11/2021 |

* cited by examiner

*Primary Examiner* — Paul N Dickson
*Assistant Examiner* — Shams Dhanani
(74) *Attorney, Agent, or Firm* — Lempia Summerfield Katz LLC

(57) ABSTRACT

A frame structure for a purpose built vehicle (PBV) includes: two main side members extending while gradually rising toward a front of the PBV and extending in a front/rear direction to be disposed on either side of the PBV; two auxiliary side members respectively extending in a front/rear direction to be disposed on a lower side of the two main side members; a front cross member connecting the two auxiliary side members in a lateral direction of the PBV; and a plurality of vertical members respectively connecting the main side members and the auxiliary side members in a vertical direction.

19 Claims, 4 Drawing Sheets

FRAME STRUCTURE FOR A PURPOSE BUILT VEHICLE

CROSS REFERENCE TO RELATED APPLICATION

The present application claims priority to Korean Patent Application No. 10-2022-0022199, filed Feb. 21, 2022, the entire contents of which are incorporated herein for all purposes by this reference.

BACKGROUND

Field of the Disclosure

The present disclosure relates to a technology for a frame structure for a purpose built vehicle (PBV).

DESCRIPTION OF THE RELATED ART

A purpose built vehicle (PBV) includes a life module in which various types of boarding and loading space are provided according to market needs and a drive module relating to the actual traveling of a vehicle. Coupling the life module to a fixed drive module as demanded by various market needs facilitates the production of various vehicle models. This allows for a very effective response to the market trends of high-mix low-volume production.

When a life module is adopted in pursuit of securing a very large interior space, the vehicle tends to have a very short overhang and a driver tends to be located in the front of the vehicle.

Technical requirements of a frame of a drive module that is coupled to the life module described above include securing sufficient buffer performance against a front collision of the vehicle despite the short overhang as described above and include securing a space for mounting a power unit such as an electrical output system module and the like. The power unit is mounted in the front of the vehicle and produces the substantial driving force of the vehicle.

The matters described above as a background of the present disclosure are intended only to better understand the background of the present disclosure. Such matters are not to be taken as an acknowledgment that they pertain to the conventional art already known to those of ordinary skill in the art.

SUMMARY

An object of the present disclosure is to provide a frame structure for a purpose built vehicle (PBV) that is configured to maximize the front collision performance of the vehicle despite a short overhang, to secure sufficient space for mounting a power unit, and to provide a mounting function for chassis parts such as a suspension and the like.

According to an aspect of the present disclosure, the frame structure for the PBV may include: two main side members extending while gradually rising toward the front of the vehicle and extending in the front/rear direction to be disposed on either side of the vehicle; two auxiliary side members respectively extending in the front/rear direction of the vehicle to be disposed on a lower side of the two main side members; a front cross member connecting the two auxiliary side members in a lateral direction of the vehicle; and a plurality of vertical members connecting the main side member and the auxiliary side member in the up/down direction.

The two auxiliary side members may be formed to extend toward the front of the vehicle in the horizontal direction such that a distance to the two main side members in the vertical direction may gradually increase as the front of the vehicle is approached.

A rear cross member may connect the two main side members at the same height as the two auxiliary side members and may be provided at the rear of the two auxiliary side members. A front/rear column may be formed to extend in the front/rear direction of the vehicle and may be provided at the rear of each of the two auxiliary side members to support or connect the two auxiliary side members to the rear cross member.

The rear cross member may include a power unit bracket for fixing the power unit that generates the driving force of the vehicle.

The plurality of vertical members may include: a front vertical member on each side of the PBV connecting front end portions of the two main side members and the two auxiliary side members; a rear vertical member on each side of the PBV connecting a rear end portion of the two auxiliary side members to the two main side members; and a center vertical member on each side of the PBV connecting the two auxiliary side members to the two main side members between the respective front vertical member and rear vertical member.

The auxiliary side members may be disposed closer to each other than are the main side members in the vehicle width or lateral direction. A portion of each of the two auxiliary side members, between a portion to which the center e member is connected and a portion to which the rear vertical member is connected, may curve outward in the vehicle width or lateral direction to be close to the two main side members, respectively.

The front vertical member and the center vertical member on each side of the PBV may be formed in a shape curving inward in the vehicle width or lateral direction to narrow from the upper end to the lower end thereof. A beam or bumper may be mounted at the upper front of the front vertical members to match the front end portion of the two main side members and protrude toward the vehicle front.

A lower arm bracket supporting a vehicle front side of a lower arm of a suspension may be provided on each side of the PBV between a corresponding auxiliary side member and the respective center vertical member. A lower end of the rear vertical member may support the vehicle rear side of the lower arm.

The two main side members may each be provided with a suspension bracket on an upper side of a portion to which the corresponding center vertical member is connected. The suspension bracket may support an upper arm of the vehicle suspension and support a shock absorber and a suspension spring.

The two auxiliary side members may each be provided with a step bar bracket for supporting a stabilizer bar on the front side of the lower arm bracket.

A steering device may be installed on the front side of each of the center vertical members.

Further, in order to achieve the objects described above, the frame structure for the PBV of the present disclosure may include: two main side members extending in a front/rear direction to be disposed on either side of the PBV; two auxiliary side members disposed on a lower side of a front portion of the two main side members, respectively; a rear cross member connecting the two main side members in a lateral direction of the PBV; a front cross member connecting the two auxiliary side members in the lateral direction on a front side of the rear cross member; and a plurality of vertical members connecting the two main side members and the two auxiliary side members in the vertical direction.

A rear end portion of each of the two auxiliary side members may be connected to the rear cross member by a respective front/rear column extending in the front/rear direction of the vehicle. The two auxiliary side members and the front/rear columns may extend from the rear cross member toward the vehicle front in the horizontal direction.

The two main side members may be formed in a shape extending while gradually rising upward toward the front of the vehicle from a portion to which the rear cross member is connected. The plurality of vertical members may be installed to connect a lower side of a portion of the two main side members extending while rising upward toward the front to an upper side of the two auxiliary side members.

The plurality of vertical members may include a front vertical member on each side of the PBV vertically connecting a front end portion of the two main side members and a front end portion of the two auxiliary side members. The vertical members may also include a rear vertical member on each side of the PBV connecting a rear end portion of the two auxiliary side members and the two main side members.

A lower end of the rear vertical members may each be formed to support a vehicle rear side of a lower arm of a vehicle suspension. The two auxiliary side members may each be provided with a lower arm bracket to support a vehicle front side of the respective lower arm.

A center vertical member connecting the main side member and the auxiliary side member may be further provided on each side of the PBV between the respective front vertical member and rear vertical member.

The two auxiliary side members may be disposed closer to each other than are the main side members in the vehicle width or lateral direction. A portion of each of the two auxiliary side members, between a portion to which the center vertical member is connected and a portion to which the rear vertical member is connected, may be formed to curve outward in the vehicle width or lateral direction to be close to the two main side members, respectively. The front vertical members and the center vertical members may be formed in a shape curving inward in the vehicle width or lateral direction to narrow from the upper end to the lower end.

The front cross member may be installed to connect to each of the two auxiliary side members between a portion to which the front vertical members are connected and a portion to which the center vertical members are connected.

The two main side members may be provided with a suspension bracket on an upper side of a portion to which the corresponding center vertical members are connected. The suspension brackets may each support an upper arm of a vehicle suspension and support a shock absorber and a suspension spring on an upper side thereof. The rear cross member may be provided with a power unit bracket for fixing the power unit that generates the driving force of the vehicle.

The frame structure for the PBV of the present disclosure may maximize the front collision performance of the vehicle even when the overhang is short, allow sufficient power unit mounting space, and provide a mounting function for chassis parts such as a suspension and the like.

DETAILED DESCRIPTION OF THE DISCLOSURE

Figure 1:
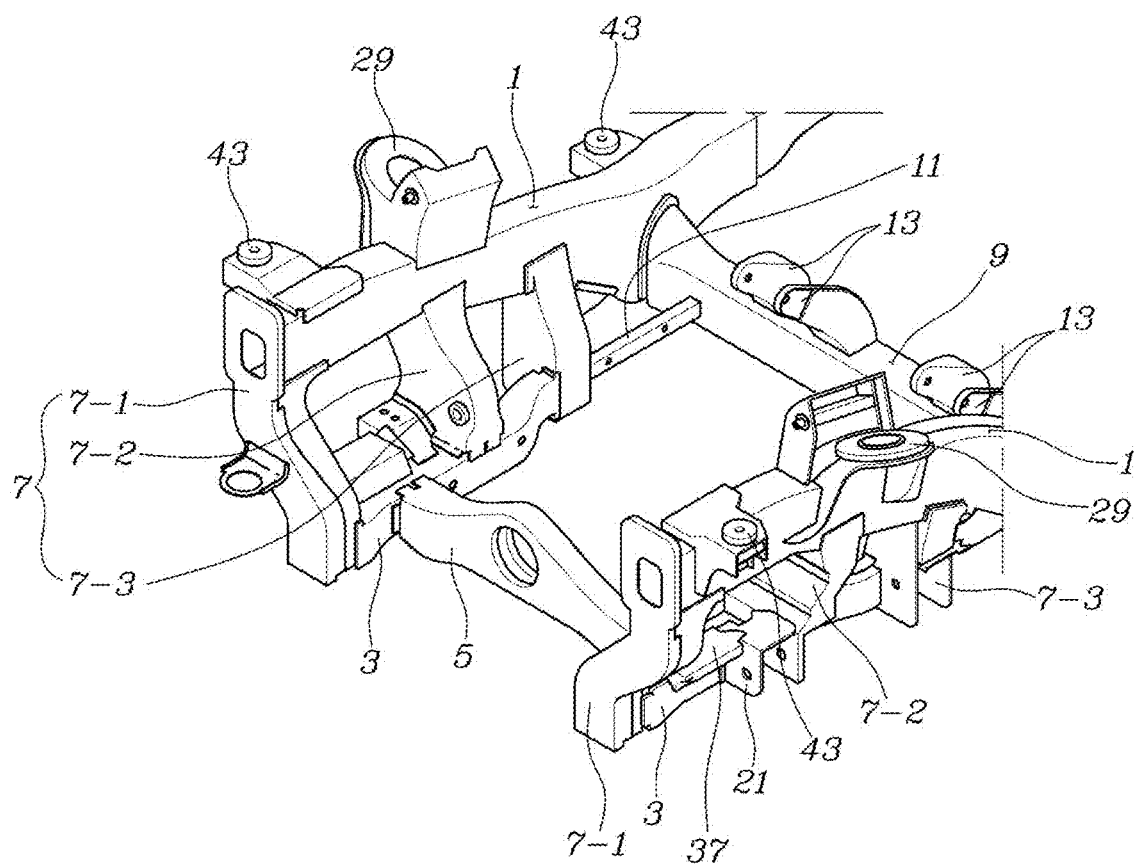
FIG. 1 is a view illustrating a frame structure for a purpose built vehicle (PBV) according to the present disclosure.
Figure 2:
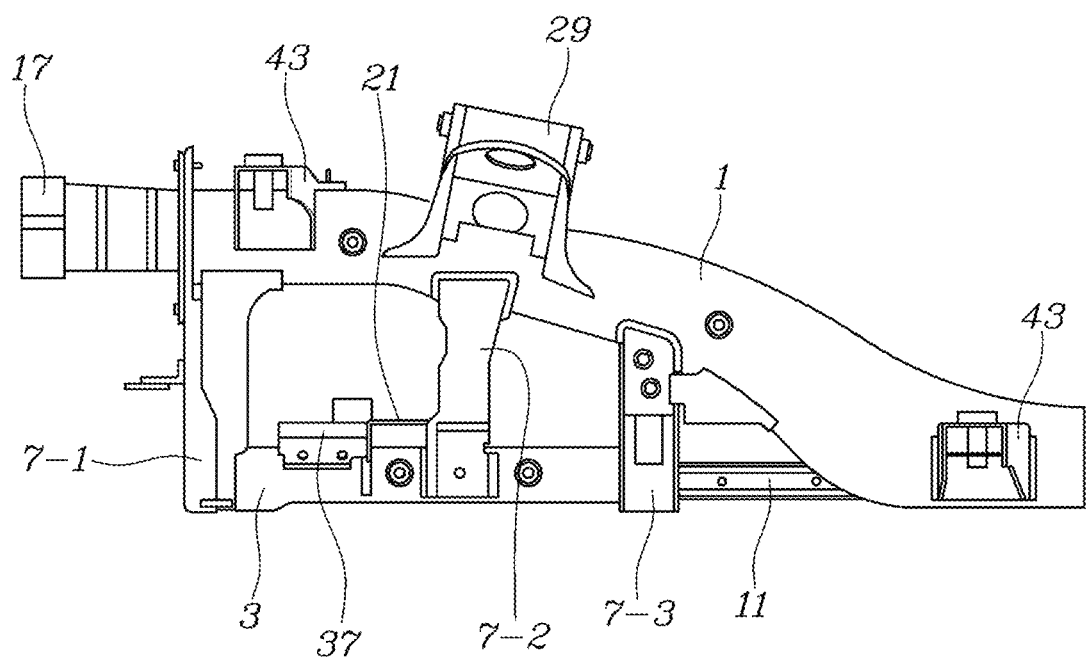
FIG. 2 is a side view of the frame structure for the PBV in FIG. 1.

The specific structural or functional descriptions of the embodiments disclosed in the present specification or application are merely provided for the purpose of describing the embodiments according to the present disclosure. The embodiments of the present disclosure may be implemented in various forms, and the present inventive concept is not to be interpreted as being limited to the embodiments described in the present specification or application.

The embodiments according to the present disclosure may be subject to various modifications and have various forms. Specific embodiments are illustrated in the drawings and described in detail in the present specification or application. It is to be understood that this is not intended to limit the embodiments according to the concept of the present disclosure to the specific disclosed forms and that all modifications, equivalents, and substitutes within the spirit and technical scope of the present disclosure are included.

Terms such as first, second, etc. may be used to describe various components, but the components are not to be limited by the terms. The terms may only be used for the purpose of distinguishing one component from another. For example, without departing from the scope of the present disclosure, a first component may be denoted as a second component, and similarly, a second component may also be denoted as a first component.

When a component is referred to as being "connected" or "coupled" to another component, the component may be directly connected or coupled to the other component. It is to be understood that other components may exist in between. On the other hand, when a component is referred to as being "directly connected" or "directly coupled" to another component, it is to be understood that there are no intervening components present. Other expressions describing a relationship between components, such as, "between", "just between", "neighboring", and "directly neighboring" are to be interpreted in the same manner.

The terms used herein are used for the purpose of describing specific embodiments only and are not intended to limit the disclosure. Singular expressions include plural expressions unless the context explicitly indicates otherwise. In the present specification, terms such as "comprise" or "have" are intended to designate the presence of implemented features, numbers, steps, operations, components, parts, or combinations thereof described in the specification and are not to be understood to preclude the presence or additional possibilities of one or more of other features, numbers, steps, operations, components, parts or combinations thereof in advance.

Unless otherwise defined, all terms used herein, including technical or scientific terms, may have the same meanings as are generally understood by those of ordinary skill in the art to which the present disclosure pertains. The terms such as those defined in commonly used dictionaries are to be interpreted as having meanings consistent with their meanings in the context of the related technology and are not to be interpreted in an idealized or overly formal sense unless expressly so defined herein. When a component, device, element, or the like of the present disclosure is described as having a purpose or performing an operation, function, or the like, the component, device, or element should be considered herein as being "configured to" meet that purpose or perform that operation or function. Further, as used herein, vertical is meant only to define an orientation that is generally in a vertical, i.e., an up/down, upright, or upstanding direction or position and not necessarily precisely vertical. Also, as used herein, horizontal is meant only to define an orientation that is generally in a horizontal, i.e., a front/rear, side/side, transverse, lateral, recumbent, or lying direction or position and not necessarily precisely horizontal.

Hereinafter, the present inventive concept is described in detail by describing embodiments of the present disclosure with reference to the accompanying drawings. The same reference numerals presented in each drawing refer to the same members.

FIGS. 1-4 show that, according to an embodiment of the present disclosure, a frame structure for a purpose built vehicle (PBV) includes main side members 1 (two such main side members in this example) extending while gradually rising toward the front of a vehicle and extending in the front/rear direction to be disposed on either side of the vehicle. The frame structure also includes auxiliary side members 3 (two such auxiliary side members in this example) respectively extending in the front/rear direction of the vehicle to be disposed on a lower side of the two main side members 1. The frame structure further includes a front cross member 5 connecting the two auxiliary side members 3 in the lateral direction of the vehicle. The frame structure also includes a plurality of vertical or up/down members 7 connecting each main side member 1 and the corresponding auxiliary side member 3 in the vertical or up/down direction.

In other words, the main side members 1 and the auxiliary side members 3 are disposed on either side of the vehicle in the vehicle width direction with the main side members 1 being above the auxiliary side members 3. The main side member 1 and the auxiliary side member 3 on each vehicle side are connected by a plurality of vertical members 7 and the two auxiliary side members are connected to each other by the front cross member 5.

The auxiliary side members 3 are formed to extend toward the front of the vehicle in the horizontal direction such that a distance to the corresponding main side members 1 in the vertical direction gradually increases as the front of the vehicle is approached, i.e., moving toward the front of the PBV.

Further, a rear cross member 9 connects the main side members 1 in a lateral direction of the vehicle on either side and at the same height at which the auxiliary side members 3 are provided at the rear of the auxiliary side members 3. A front/rear column 11 is formed and arranged to extend in the front/rear direction to support or connect each of the auxiliary side members 3 to the rear cross member 9 and are provided in the rear of the corresponding auxiliary side members 3.

Accordingly, the main side members 1 and the auxiliary side members 3 absorb the impact energy when an impact comes from the front of the vehicle. Also, the auxiliary side members 3 are firmly supported by the rear cross member 9 and the front/rear columns 11.

The rear cross member 9 is provided with a power unit bracket 13 for fixing the power unit that generates the driving force of the vehicle. For reference, an electric output system module 15, which is the power unit, is supported by the power unit bracket 13 in the example in FIG. 4.

In other words, the electrical output system module 15 is mounted in a mounting space formed between the front cross member 5, the rear cross member 9, the main side member 1. Thus, the auxiliary side members 3 allow stable support and protection of the electrical output system module 15.

Figure 4:
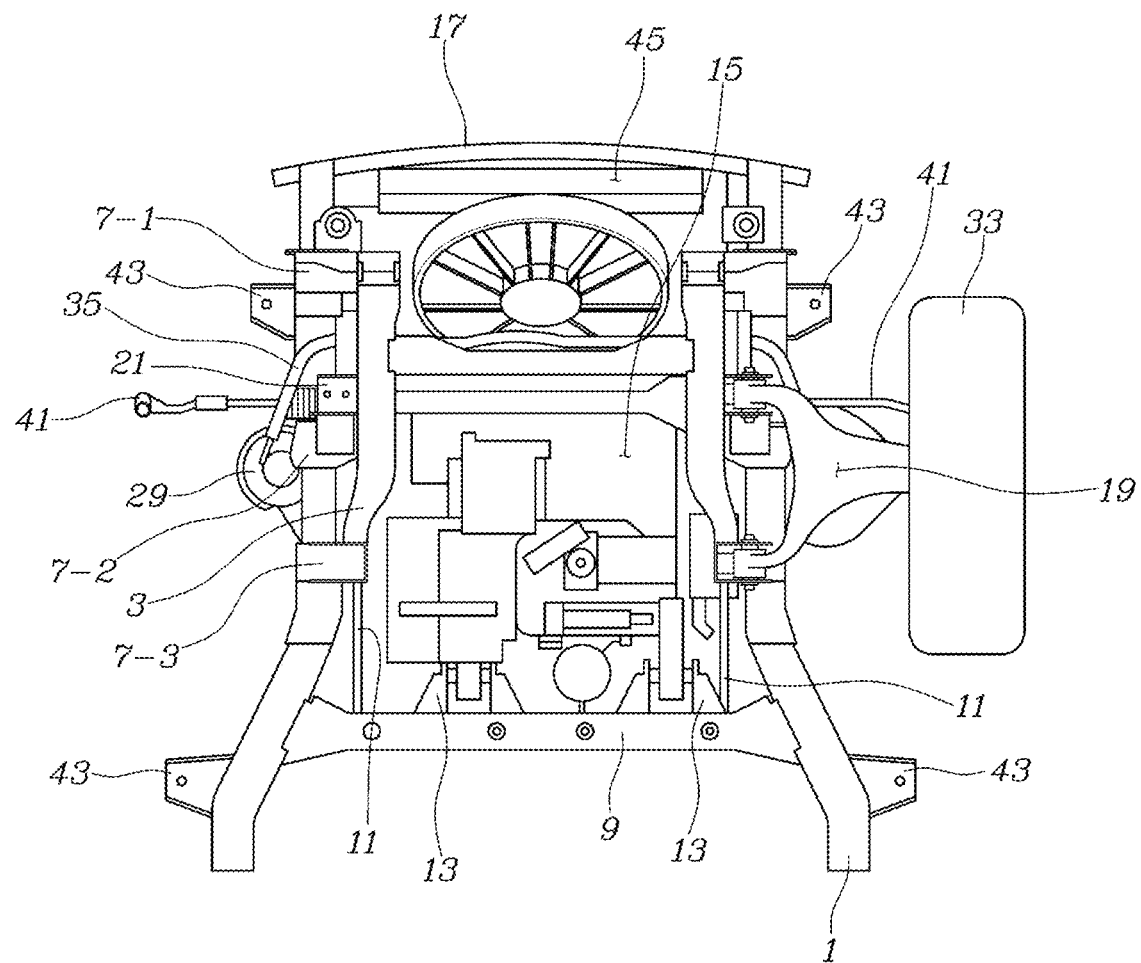
FIG. 4 is a view illustrating a PBV having the frame structure in FIG. 1 viewed from the bottom.

For reference, a cooling device 45 for cooling of the electrical output system module 15 is also illustrated in FIG. 4.

According to an embodiment, the plurality of vertical members 7 may include a front vertical member 7-1 on each side of the PBV connecting front end portions of the respective main side member 1 and auxiliary side member 3. The vertical members may also include a rear vertical member 7-3 on each side of the PBV connecting a rear end portion of one of the auxiliary side members 3 to the corresponding main side member 1. The vertical members 7 may further include a center vertical member 7-2 on each side of the PBV connecting one of the auxiliary side member to the corresponding main side member 1 between the front vertical member 7-1 and the rear vertical member 7-3.

The auxiliary side members 3 are disposed closer to each other than are the main side members 1 in the vehicle width direction. A portion of each auxiliary side member 3, between a portion to which the center vertical member 7-2 is connected and a portion to which the rear vertical member 7-3 is connected, curves outward in the vehicle width direction to be close to the corresponding main side member 1.

Accordingly, an impact force input to the rear through the auxiliary side members 3 is delivered to the rear cross member by the front/rear columns 11 and is also effectively dispersed to the main side members 1 through the rear vertical members 7-3.

The front vertical members 7-1 and the center vertical members 7-2 are formed in a shape curving inward in the vehicle width direction to narrow from the upper end to the lower end. A beam 17 or bumper is mounted in the upper front of the front vertical member 7-1 to match the front end portion of the main side member 1 and protrude toward the front of the vehicle.

In other words, the front vertical members 7-1 perform the function of connecting the main side members 1 and the auxiliary side members 3 in the vertical direction while providing a mounting surface on which a rear end or rear facing portion of the beam 17 is mounted For reference, the beam 17 may serve to absorb relatively small deformations during a low-speed collision of the vehicle mostly while the auxiliary side members 3 serve to absorb comparatively large deformations during a relatively high-speed collision.

A lower arm bracket 21 is provided on each side of the PBV for supporting a vehicle front side of a lower arm 19 of a vehicle suspension. Each lower arm bracket 21 is provided in this example between the auxiliary side member 3 and the center vertical member 7-2. The rear vertical members 7-3 are formed to support a vehicle rear side of the lower arm 19.

The main side member 1 is provided with a suspension bracket 29 on each side of the PBV on an upper side of a portion to which the center vertical member 7-2 is connected. The suspension brackets 29 support an upper arm 23 of the vehicle suspension and support a shock absorber 25 and a suspension spring 27.

In other words, the lower arm 19 of the vehicle suspension on each side of the PBV is supported by the lower arm bracket 21 and the rear vertical member 7-3, and the upper arm 23 is supported by the suspension bracket 29.

For reference, a steering knuckle 31 is provided between the lower arm 19 and the upper arm 23 on each side of the PBV. A wheel 33 is coupled through the steering knuckle 31. The shock absorber 25 and the suspension spring 27 are mounted between the steering knuckle 31 and the suspension bracket 29 so that the wheel 33 may absorb the impact delivered from the road surface.

On the other hand, the auxiliary side members 3 are each provided with a step bar bracket 37 for supporting a stabilizer bar 35 on the front side of the lower arm bracket 21.

Figure 3:
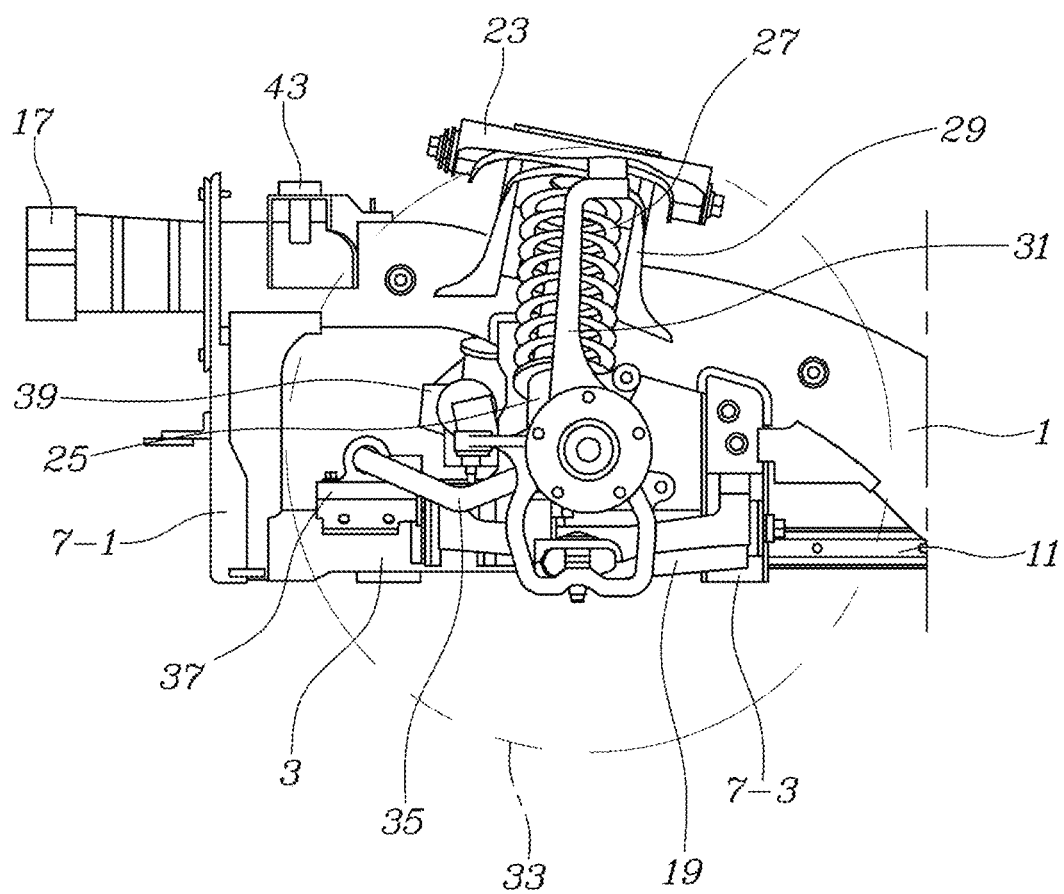
FIG. 3 is a view illustrating the frame structure for a PBV in FIG. 2 in a state where a suspension and a steering device are mounted.

FIG. 3 illustrates a state in which the stabilizer bar 35 is supported by the step bar bracket 37 on each side of the PBV.

Further, a steering device 39 is installed on the front side of each of the center vertical members 7-2.

FIGS. 3 and 4 show that a tie rod 41 constituting each steering device 39 is connected to the respective steering knuckle 31.

As described above, the frame of the present disclosure maximizes the front collision performance of the vehicle, allows sufficient power unit mounting space, and implements a mounting function for chassis parts such as vehicle suspension components, steering components, and the like.

On the other hand, the main side members 1 are provided with a plurality of body coupling brackets 43 to which the life modules are coupled. Thus, the coupling of various different life modules is possible, which facilitates the production of various vehicle models.

Specific embodiments of the present disclosure are illustrated and described, but it should be self-evident to those of ordinary skill in the art that the present disclosure may be improved upon and modified in various ways without departing from the scope and the technical spirit of the present inventive concept provided by the patent claims below.

What is claimed is:

1. A frame structure for a purpose built vehicle (PBV) comprising:
    two main side members extending while gradually rising toward a front of the PBV and extending in a front/rear direction to be disposed on either side of the PBV;
    two auxiliary side members respectively extending in a front/rear direction to be disposed on a lower side of the two main side members;
    a front cross member connecting the two auxiliary side members in a lateral direction of the PBV;
    a plurality of vertical members respectively connecting each of the two main side members and the two auxiliary side members in a vertical direction; and
    a rear cross member connecting the two main side members on either side of the PBV, the rear cross member provided at the rear of the two auxiliary side members, wherein the rear cross member is provided with a power unit bracket for fixing a power unit that generates a driving force of the PBV.

2. The frame structure for the PBV of claim 1, wherein the two auxiliary side members extend toward the front of the PBV in a horizontal direction such that a distance to the two main side members, respectively, in the vertical direction gradually increases as the front of the PBV is approached.

3. The frame structure for the PBV of claim 2, wherein the rear cross member connects the two main side members on either side of the PBV at the same height as the two auxiliary side, and
    a front/rear column extends in the front/rear direction of the PBV connecting each of the two auxiliary side members to the rear cross member and each is provided at the rear of the two auxiliary side members.

4. The frame structure for the PBV of claim 2, wherein the plurality of vertical members includes:
    a front vertical member respectively connecting front end portions of each of the two main side members and each of the two auxiliary side member;
    a rear vertical member respectively connecting a rear end portion of each of the two auxiliary side members to each of the two main side members; and
    a center vertical member respectively connecting each of the two auxiliary side members to each of the two main side member between the corresponding front vertical member and the rear vertical member.

5. The frame structure for the PBV of claim 4, wherein the two auxiliary side members are disposed closer to each other than are the two main side members in the lateral direction, and
    a portion of each of the two auxiliary side members, between a portion to which the corresponding center vertical member is connected and a portion to which the corresponding rear vertical member is connected, curves outward in the lateral direction to be close to the two main side members, respectively.

6. The frame structure for the PBV of claim 5, wherein the front vertical members and the center vertical members are formed in a shape curving inward in the lateral direction to narrow from an upper end to a lower end thereof, and
    a beam is installed at an upper front of the front vertical members to match a front end portion of the two main side members and protrude toward the vehicle front.

7. The frame structure for the PBV of claim 4, wherein
    a lower arm bracket supports a vehicle front side of a lower arm of a vehicle suspension and is provided between the auxiliary side member and the center vertical member on each side of the PBV, and
    the rear vertical member supports a vehicle rear side of the lower arm on each side of the PBV.

8. The frame structure for the PBV of claim 7, wherein each of the two main side members is provided with a suspension bracket on an upper side of a portion to which the corresponding center vertical member is connected, and
    each suspension bracket supports an upper arm of the vehicle suspension and supports a shock absorber and a suspension spring.

9. The frame structure or the PBV of claim 7, wherein each of the two auxiliary side members is provided with a step bar bracket for supporting a stabilizer bar on a front side of the lower arm bracket.

10. The frame structure for the PBV of claim 7, wherein a steering device is installed on a front side of each of the center vertical members.

11. A frame structure for a purpose built vehicle (PBV), comprising:
    two main side members extending in a front/rear direction to be disposed on either side of the PBV;
    two auxiliary side members each respectively disposed on a lower side of a front portion of the two main side member;
    a rear cross member connecting the two main side members in a lateral direction of the PBV;
    a front cross member connecting the two auxiliary side members in the lateral direction of the PBV on a front side of the rear cross member; and a plurality of vertical members respectively connecting the two main side members and the two auxiliary side members in a vertical direction, wherein the two main side members are shaped to extend while gradually rising upward toward the front of the vehicle from a portion to which the rear cross member is connected, and wherein the rear cross member is provided with a power unit bracket for fixing a power unit that generates a driving force of the vehicle.

12. The frame structure for the PBV of claim 11, wherein a rear end portion of each of the two auxiliary side members is connected to the rear cross member by a respective front/rear column extending in the front/rear direction of the PBV, and the two auxiliary side members and the respective front/rear columns extend from the rear cross member to a vehicle front in a horizontal direction.

13. The frame structure for the PBV of claim 12, wherein the plurality of vertical members is installed to connect a lower side of a portion of each of the two main side members extending while gradually rising upward toward the front to an upper side of each of the two auxiliary side members.

14. The frame structure for the PBV of claim 13, wherein the plurality of vertical members comprises:

a front vertical member on each side of the PBV vertically connecting a front end portion of a corresponding main side member and a front end portion of a corresponding auxiliary side member; and a rear vertical member on each side of the PBV connecting a rear end portion of the corresponding auxiliary side member to the corresponding main side member.

15. The frame structure for the PBV of claim 14, wherein a lower side of the rear vertical member is formed to support a vehicle rear side of a lower arm of a vehicle suspension on each side of the PBV, and the two auxiliary side members are each provided with a lower arm bracket to support a vehicle front side of the lower arm.

16. The frame structure for the PBV of claim 15, wherein a center vertical member of the plurality of vertical members connects the corresponding main side member and the corresponding auxiliary side member on each side of the PBV and is further provided between the respective front vertical member and the rear vertical member.

17. The frame structure for PBV of claim 16, wherein the two auxiliary side members are disposed closer to each other than are the main side members in the lateral direction, a portion of the two auxiliary side members, between a portion to which the center vertical member is connected and a portion to which the rear vertical member, curves outward in the lateral direction to be close to the two main side members, respectively, and the front vertical members and the center vertical members are shaped curving inward in the lateral direction to narrow from an upper side to a lower side thereof.

18. The frame structure for the PBV of claim 16, wherein the front cross member connects the two auxiliary side members between a portion to which the respective front vertical members of the two auxiliary side members is connected and a portion to which the respective center vertical members are connected.

19. The frame structure for the PBV of claim 16, wherein the two main side members are each provided with a suspension bracket on an upper side of a portion to which the corresponding center vertical member is connected, the suspension bracket supporting an upper arm of the vehicle suspension and supporting a shock absorber and a suspension spring.

\* \* \* \* \*